United States Patent
Immendoerfer et al.

(10) Patent No.: US 9,742,233 B2
(45) Date of Patent: Aug. 22, 2017

(54) REDUCTION OF ELECTROLYTIC CORROSION IN A BRUSHLESS DIRECT-CURRENT MOTOR

(71) Applicant: Robert Bosch GmbH, Stuttgart (DE)

(72) Inventors: Ingo Immendoerfer, Tamm (DE); Stefan Ruedinger, Stuttgart (DE); Markus Matzke, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 673 days.

(21) Appl. No.: 14/366,738

(22) PCT Filed: Dec. 11, 2012

(86) PCT No.: PCT/EP2012/075063
§ 371 (c)(1),
(2) Date: Jun. 19, 2014

(87) PCT Pub. No.: WO2013/092295
PCT Pub. Date: Jun. 27, 2013

(65) Prior Publication Data
US 2014/0339946 A1    Nov. 20, 2014

(30) Foreign Application Priority Data

Dec. 21, 2011 (DE) .......... 10 2011 089 492

(51) Int. Cl.
*H02K 3/00* (2006.01)
*H02K 3/44* (2006.01)
(Continued)

(52) U.S. Cl.
CPC ............... *H02K 3/44* (2013.01); *C23F 13/04* (2013.01); *C23F 13/06* (2013.01); *H02P 6/34* (2016.02)

(58) Field of Classification Search
CPC ............... H02K 3/44; H02K 3/40; H02K 3/42
(Continued)

(56) References Cited

U.S. PATENT DOCUMENTS 1,608,709 A    11/1926  Mills
2,276,714 A    3/1942   Brown
(Continued)

OTHER PUBLICATIONS

International Search Report for Application No. PCT/EP2012/075063 dated Mar. 14, 2013 (English Translation, 2 pages).

*Primary Examiner* — Hanh Nguyen
(74) *Attorney, Agent, or Firm* — Michael Best & Friedrich LLP

(57) ABSTRACT

The invention relates to a control device (1) for reducing electrolytic corrosion in a brushless direct-current motor (3). The control device (1) is designed to control phases (9, 11, 13) of the brushless direct-current motor (3). The control device (1) has a potential equalization connection (5) and a potential equalization line (7). The potential equalization line (7) is designed to connect the brushless direct-current motor (3) to the potential equalization connection (5). An anti-corrosion resistor ($R_K$) is provided on the potential equalization line (7), which anti-corrosion resistor is designed to reduce a current flow between the phases (9, 11, 13) of the brushless direct-current motor (3) and the potential equalization line (7).

10 Claims, 4 Drawing Sheets

(51) Int. Cl.
  *C23F 13/04*   (2006.01)
  *C23F 13/06*   (2006.01)
  *H02P 6/34*    (2016.01)

(58) Field of Classification Search
  USPC .................................................. 310/179, 87
  See application file for complete search history.

(56) References Cited

U.S. PATENT DOCUMENTS

| | | | |
|---|---|---|---|
| 4,211,625 A | | 7/1980 | Hocutt et al. |
| 4,694,211 A | * | 9/1987 | Bayha ................. F02D 41/3082 204/196.26 |
| 2013/0119799 A1 | * | 5/2013 | Honda ............... H02K 11/0094 310/71 |

* cited by examiner

REDUCTION OF ELECTROLYTIC CORROSION IN A BRUSHLESS DIRECT-CURRENT MOTOR

BACKGROUND OF THE INVENTION

Electric motors are used in many areas of technology. For example, electric motors can be used to drive pumps. If the electric motor here is located in an electrically conductive medium, erosion of the material can occur between components which are located in the conductive medium and are at different electrical potentials. This so-called electrolysis effect can lead to an erosion of material from protective layers in the electric motor. As a result, core materials of the electric motor can be exposed and are in turn subjected to further erosion of material through the electrolysis effect and additionally to corrosion by the conductive and corrosive medium.

In order to reduce the electrolysis effect, the electrical resistance of the conductive medium can be increased by influencing the flow path within the conductive medium in such a way that the transportation of material in the medium is reduced. This may be done, for example, by lengthening the effective flow path between the components which are at different potentials, by installing obstacles such as, for example, wall elements. In addition, this can be achieved by reducing the effective flow cross section in the conductive medium by installing narrow passages such as, for example, seals. In addition, the electrolysis effect can be reduced by virtue of the fact that a chronological interruption occurs in the voltage applied to the different components. In this way, there is only a restricted flow of current in the conductive material so that erosion of material is reduced.

In some applications of electric motors it may be appropriate to provide a potential equalization line. This line, can, when considered as a chronological average, not be connected to the same potential as other components of the electric motor.

SUMMARY OF THE INVENTION

There may therefore be a need to reduce an electrolysis effect between components of an electric motor and a potential equalization line in an electrically conductive medium.

Features, details and possible advantages of a device according to embodiments of the invention are discussed below in detail.

According to a first aspect of the invention, a control device for reducing electrolytic corrosion in a brushless direct-current motor is presented. The control device is designed to actuate phases of the brushless direct-current motor. The control device has a potential equalization connection and a potential equalization line. The potential equalization line is designed here to connect the brushless direct-current motor to the potential equalization connection. An anti-corrosion resistance is provided on the potential equalization line, which anti-corrosion resistance is designed to reduce a flow of current between the phases of the brushless direct-current motor and the potential equalization line.

In other words, the idea of the present invention is to minimize an undesired flow of current and associated corrosion effects between components of the brushless direct-current motor and a potential equalization line by virtue of the fact that a high-impedance electrical resistance is provided on the potential equalization line. High impedance means here that the electrical resistance on the potential equalization line is significantly higher than the other resistances present in the electric motor and in the control device. In particular, this anti-corrosion resistance is higher than the virtual electrical resistance of the electrically conductive medium in which the potential equalization line and the brushless direct-current motor are arranged. The use of a high-impedance resistance is possible by virtue of the fact that the potential equalization line normally does not conduct any current. In this way, the high-impedance anti-corrosion resistance does not influence or limit the functionality of the control device.

As a result, electrolysis effects between the phases of the brushless direct-current motor and the potential equalization line can be reduced considerably in an efficient and cost-effective fashion. In addition, by providing the anti-corrosion resistance it is possible to reduce electrolysis effects between a means of forming electrical contact with the brushless direct-current motor, such as, for example, a plug-type connection, and a means for forming electrical contact with the control device, for example on a flange of a fuel tank. Furthermore, electrolysis effects between individual components of the direct-current motor which are at different potentials are limited.

The control device can be used, for example, to actuate a direct-current motor in an electric feed pump, in particular in an electric fuel pump (EFP). The fuel pump can be a fuel pump with brushless direct-current motor drive (brushless DC, BLDC) and can be used to supply an internal combustion engine with fuel. In this context, the fuel pump can be arranged together with the direct-current motor in a fuel tank. The control device can be arranged outside the fuel tank and be electrically connected via a tank flange to the electric feed pump and, in particular, to the brushless direct-current motor. The feeding medium of the electric feed pump can therefore be, for example, electrically conductive fuel. This feeding medium can at least partially surround the direct-current motor and the potential equalization line.

The control device is here, for example, a control device for actuating phases of the brushless direct-current motor. The brushless direct-current motor can be an electrically commutated, permanently excited three-phase synchronous motor. For example, the direct-current motor can have three phases U, V, W which are actuated by the control device in what is referred to as a 120° block mode. The use of brushless direct-current motors may be advantageous since electrolysis effects in brushless direct-current motors are considerably reduced compared to motors with mechanical commutation systems.

The potential equalization connection which is provided on the control device provides, together with the potential equalization line, the possibility of minimizing electrical potentials of electrically conductive components such as, for example, a housing of a brushless direct-current motor or a housing of an electric fuel pump. The potential equalization connection can also be referred to as ground and can correspond, for example, to the negative pole of the feed voltage of the control device. The potential equalization connection and the potential equalization line can also be referred to as chassis ground (GND).

The potential equalization line can furthermore have here the function of preventing uncontrolled electrostatic discharges in the feeding medium. This function is referred to as an electrostatic discharge (ESD) function. In addition, the potential equalization line can serve the function of suppressing undesired electrical or electromagnetic interactions between the brushless direct-current motor and further components, for example of a motor vehicle. This function is referred to as an electromagnetic compatibility (EMC) function.

The anti-corrosion resistance can also be referred to as damping resistance and is an electrical resistance which is provided on the potential equalization line. That is to say the anti-corrosion resistance is electrically connected to the potential equalization line or directly integrated therein. In this context, the anti-corrosion resistance reduces or minimizes a flow of current in the electrically conductive medium in which the direct-current motor is located. In this context, it is possible, for example, to reduce a flow of current between the potential equalization line and phases or phase connection lines of the brushless direct-current motor. In addition, a flow of current can be reduced between further components of the direct-current motor which are at different potentials.

According to one exemplary embodiment of the invention, the potential equalization line has a line resistance. In this context, the potential equalization line can be composed, for example, of copper or have copper. The line resistance may be significantly below one ohm here. For example, the line resistance can be in the range of micro-ohms or milli-ohms. The anti-corrosion resistance is considerably or significantly larger than the line resistance here.

According to a further exemplary embodiment, the anti-corrosion resistance is in the region between 100 kilo-ohms and 1 mega-ohm. The anti-corrosion resistance is preferably between 150 and 500 kilo-ohms. In particular, the anti-corrosion resistance can be between 200 and 300 kilo-ohms. In this context, it is advantageous to select an anti-corrosion resistance below 1 mega-ohm in order to avoid influencing the above-mentioned ESD functionality of the potential equalization line. In addition, it may be advantageous to use an anti-corrosion resistance which is larger than a resistance which occurs between the phases of the direct-current motor and the potential equalization line in the electrically conductive medium by a factor of 30 to 50. In this context, this resistance which occurs in the electrically conductive medium can be approximately 5 to 15 kilo-ohms.

According to a further exemplary embodiment, the control device also has at least one capacitor on the potential equalization line. The capacitor is connected or arranged here in parallel with the anti-corrosion resistance in such a way that a high-frequency interference signal is extracted from the potential equalization line. The provision of the capacitor ensures the above-described EMC functionality of the potential equalization line. The capacitor can also be referred to as an EMC bypass capacitor. In this context, the capacitor can act together with the anti-corrosion resistance as a low-pass filter, with the effect that electrical signals in the potential equalization line which have a high frequency are attenuated. For example, the capacitor can be electrically connected to a base point at the potential equalization line in the control device. The capacitor can be, in particular, a lower-inductance capacitor. The capacitance of the capacitor may be, for example, in the value range between 1 and 100 nanofarad. This capacitor may be advantageously embodied as a ceramic capacitor.

In addition, further, under certain circumstances complex, circuits may be provided which serve the same purpose. For example, a plurality of further capacitors, electrical resistances and inductances may be provided on the potential equalization line.

According to a second aspect of the invention, a system for reducing electrolytic corrosion in a brushless direct-current motor is presented. The system has a control device, as described above, and an electric feed pump. A brushless direct-current motor is integrated into the feed pump. That is to say the feed pump interacts with the direct-current motor or is driven by means of the direct-current motor. In this context, the potential equalization line connects the electric feed pump or the housing of the feed pump to the potential equalization connection.

According to a further exemplary embodiment of the invention, the electric feed pump is designed to feed an electrically conductive feeding medium. The feeding medium may be, for example, electrically conductive fuel. For example, the fuel can have, for example, impurities. In particular, the fuel can contain ethanol. This fuel can be referred to as "bad fuel". The feeding medium has here a, for example, virtual feeding medium resistance between the phases of the brushless direct-current motor and the potential equalization line. The anti-corrosion resistance is connected in series with this feeding medium resistance or arranged in the control device. In other words, the anti-corrosion resistance is embodied as a longitudinal resistance with respect to the feeding medium resistance.

According to a further exemplary embodiment of the invention, the anti-corrosion resistance is arranged in the control device. Alternatively, the anti-corrosion resistance can be arranged on a flange, in particular a tank flange. The tank flange may be arranged, for example, on a fuel tank between an electric feed pump and a control device. According to a further exemplary embodiment of the invention, the electric feed pump is embodied as an electric fuel pump.

According to a third aspect of the invention, a method for manufacturing a control device as described above is presented. The method has the following steps: provision of a control device which is designed to actuate phases of a brushless direct-current motor; provision of a potential equalization connection on the control device; provision of a potential equalization line which is designed to connect the brushless direct-current motor to the potential equalization connection; provision of an anti-corrosion resistance on the potential equalization line. The anti-corrosion resistance is designed here to reduce a flow of current between the phases of the brushless direct-current motor and the potential equalization line.

BRIEF DESCRIPTION OF THE DRAWINGS

Further features and advantages of the present invention are apparent to a person skilled in the art from the following description of exemplary embodiments, which are, however, not to be interpreted as restricting the invention, and with reference to the appended drawings.

In said drawings.

DETAILED DESCRIPTION

All the figures are merely schematic illustrations of inventive devices or components thereof according to exemplary embodiments of the invention. In particular, distances and size relations are not represented true to scale in the figures. In the various figures, corresponding elements are provided with the same reference numbers.

Figure 1:
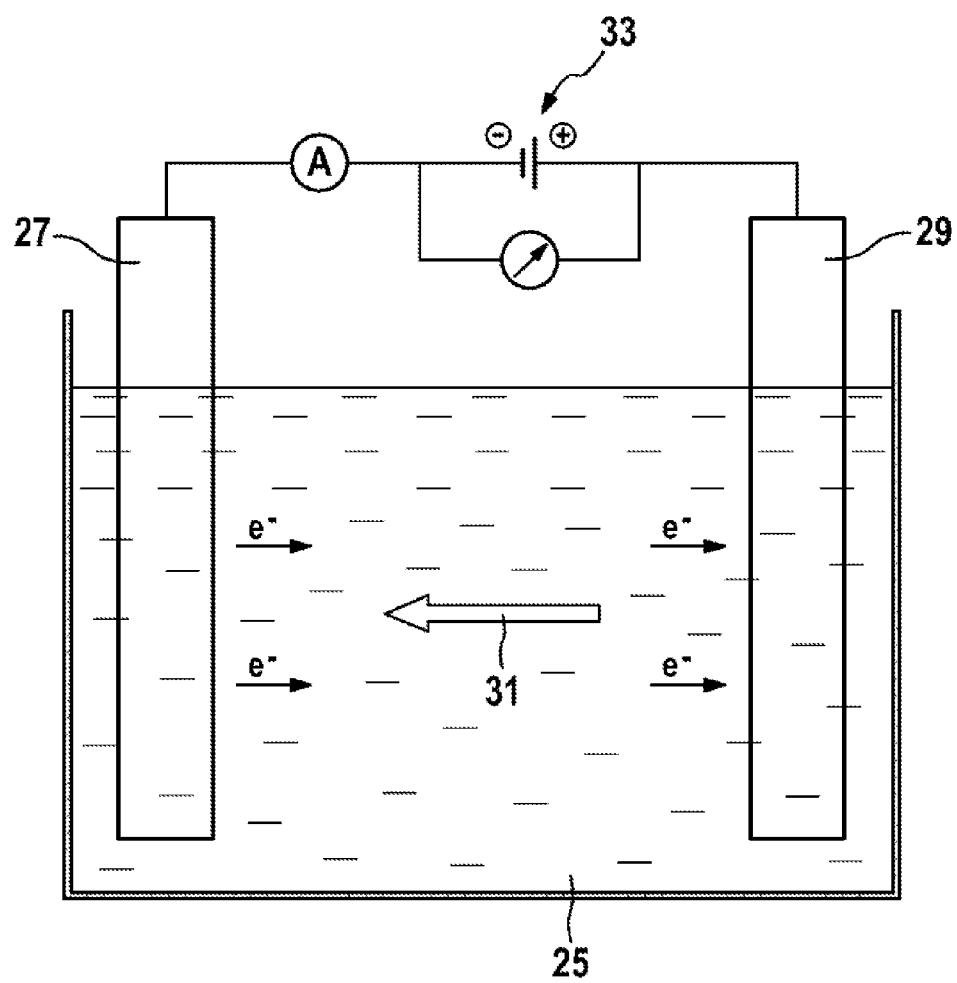
FIG. 1 shows an electrolysis effect which takes place in the electrically conductive medium.

In the figures, the control device 1 and the system 25 are illustrated using the example of an electric fuel pump with BLDC operation. The electric fuel pump and therefore the brushless direct-current motor 3 are located in the fuel in this case. The service life of the electric fuel pump can depend on the fuel quality. In corrosive and conductive fuels, an electrolysis effect can occur between components which are at different potentials, i.e. at different voltages. These components can be parts of the electric motor. FIG. 1 is a schematic view of the occurrence of an electrolysis effect or of erosion of material and corrosion 31 in an electrically conductive medium 25. In this context, a voltage of a voltage source 33 is present between an anode 29 and a cathode 27. As is apparent in FIG. 4, in this context a first phase 9 of the brushless direct-current motor can function as an anode 29, and a potential line 7 as a cathode 27. In this context, material can erode from the anode 29 and be deposited on the cathode 27.

Figure 2:
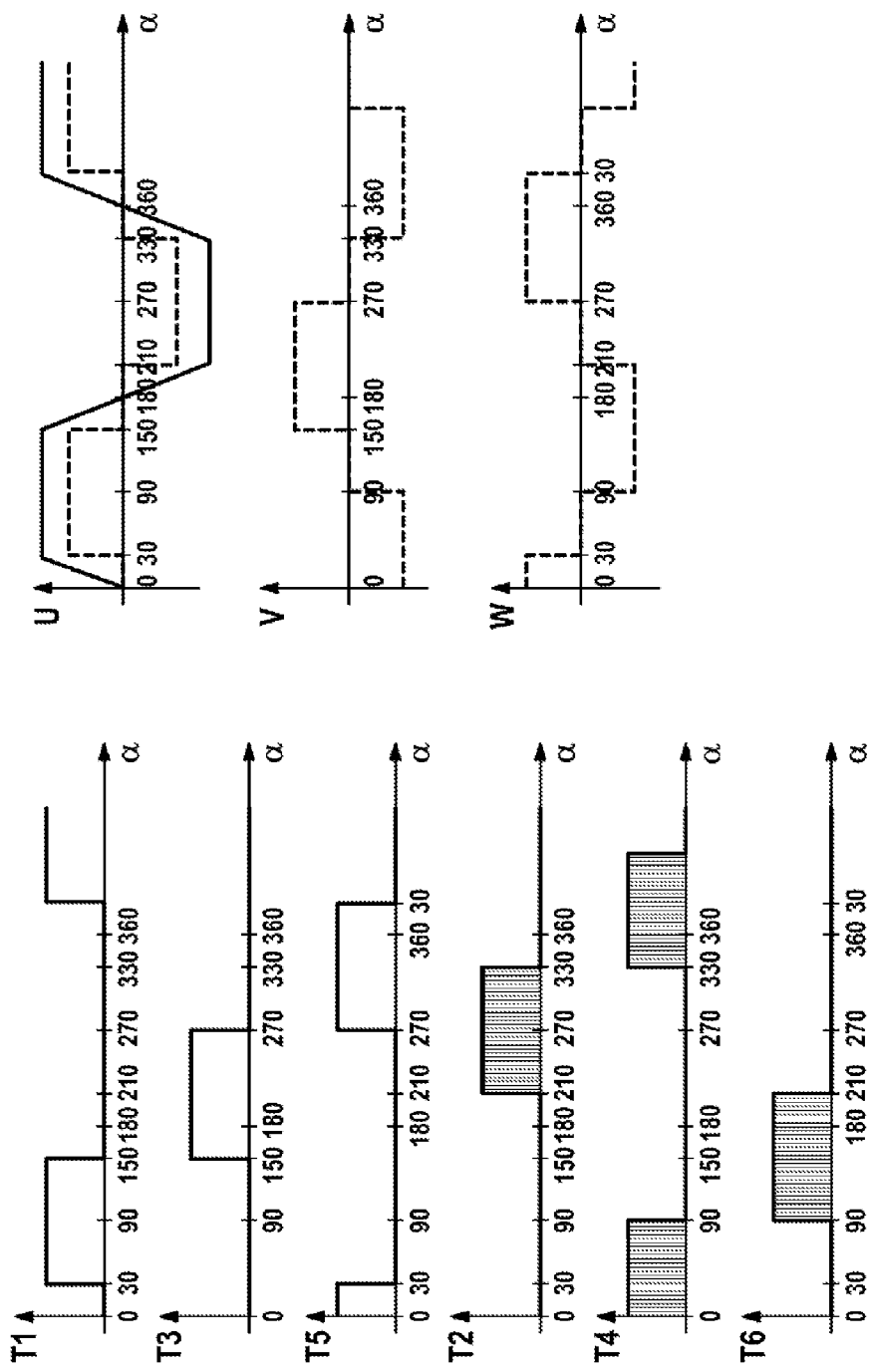
FIG. 2 shows control signals for actuating phases of a brushless direct-current motor.

This electrolysis effect occurs, for example, if a potential gradient exists between the components over relatively long time periods. This gives rise to a current in the electrically conductive medium and therefore causes erosion of material. In the brushless direct-current motor 3, there are generally pure alternating potentials between the individual phases or phase connections U, V, W. Averaged over time, the electrolysis effect and the associated corrosion between the phase connections is very low. FIG. 2 shows, for example, control signals of a control device 1 for the actuation of phases 9, 11, 13 of a brushless direct-current motor 3 in the 120° block mode. In this context, signals of the output stage transistors T1, T2, T3, T4, T5 and T6 of a 120° B6 inverter 39 are illustrated in FIG. 2A. In FIG. 2B, envelope curves of the phase currents of the 120° B6 inverter 39 are shown. An electrical angle α is plotted on the x axis, and a voltage or a current is plotted on the y axis respectively. In FIG. 2B, the dashed curve represents a current, and the continuous curve represents a pole wheel voltage. From FIG. 2 it is apparent that the currents or the potential differences between the individual phases 9, 11, 13 or U, V, W are approximately zero or very low when averaged over time.

Figure 3:
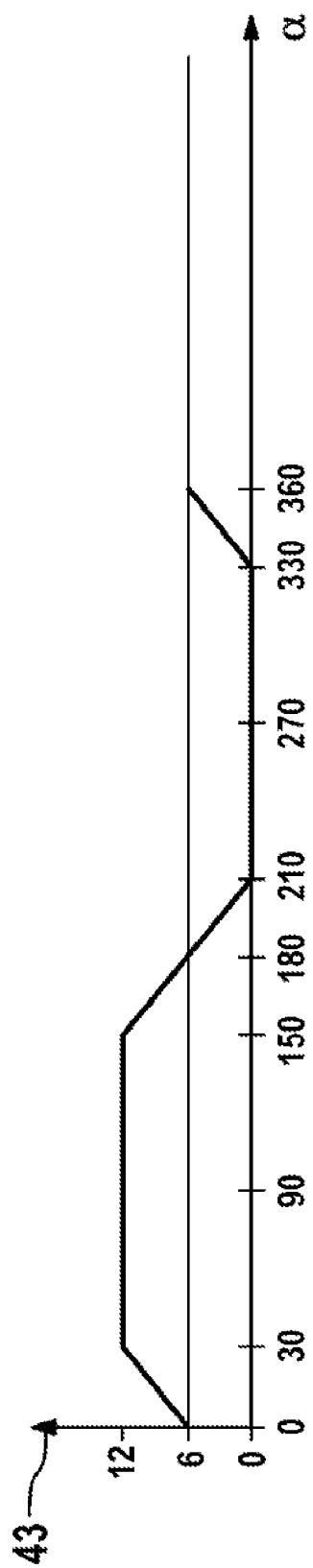
FIG. 3 shows a potential profile between a potential equalization line and a phase of a brushless direct-current motor in the 120° block mode.

However, a potential difference between a potential equalization line 7 and the individual phases 9, 11, 13 may also be present when considered averaged over time. This is illustrated, for example, in FIG. 3. FIG. 3 shows an envelope curve of a voltage 43 which is present between the first phase 9 or U and a potential equalization line 7. The same voltage differences with respect to the potential equalization line 7 occur with phase shifts for a second phase 11 or V and a third phase 13 or W. Possible effects of clocking are ignored here. The electrical angle α is plotted on the x axis of FIG. 3, and a voltage 43 is plotted in volts on the y axis. When averaged over time, a voltage of 6 volts occurs between the first phase 9 and a potential equalization line 7 in the example in FIG. 3.

Figure 4:
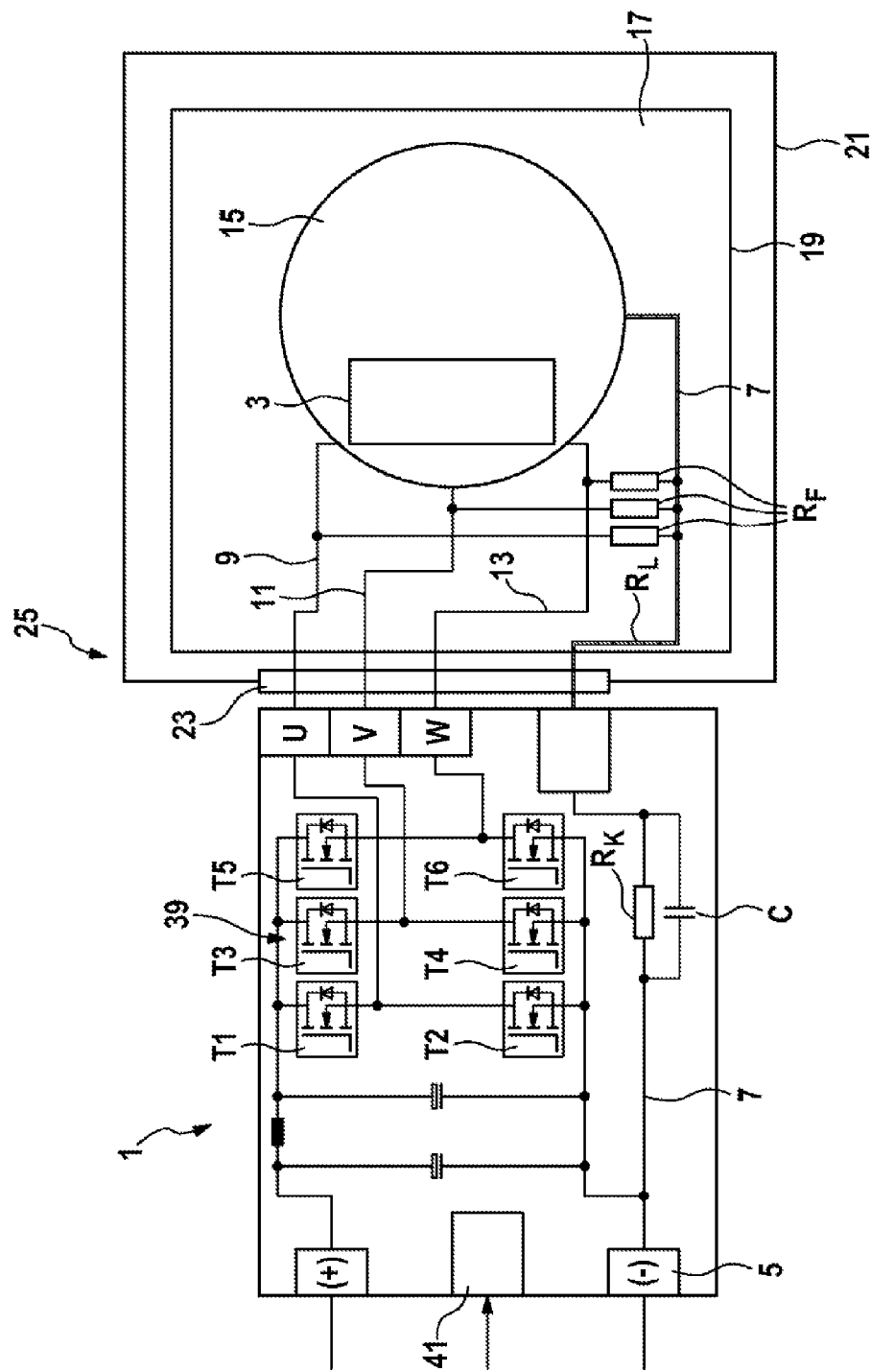
FIG. 4 shows a system with a control device and brushless direct-current motor according to an exemplary embodiment of the invention.

In order to avoid the electrolysis effect resulting from this voltage, a high-impedance anti-corrosion resistance $R_K$ is provided in the potential equalization line 7, as is shown in FIG. 4. Said anti-corrosion resistance $R_K$ is connected in series with the feeding media resistances $R_F$ occurring in the electrically conductive medium 17, and it considerably reduces electrical currents between the phases 9, 11, 13 and the potential equalization line 7.

The feeding media resistances $R_F$ which occur between the phases 9, 11, 13 and the potential equalization line 7 can be, for example, between 5 and 15 kilo-ohms. In order to reduce the electrolysis effect significantly, the anti-corrosion resistance $R_K$ may be higher than the feeding medium resistance $R_F$ by a factor of 30 to 50. For example, the anti-corrosion resistance $R_K$ can be between 100 and 500 kilo-ohms. The anti-corrosion resistance $R_K$ is inserted directly into the otherwise non-current-conducting potential equalization line 7 in the control unit 1 in the example in FIG. 4. The potential equalization line 7 retains its ESD functionality despite high impedance wiring here since the anti-corrosion resistance $R_K$ is lower than 1 mega-ohm. In addition, in order to ensure an EMC functionality, a possible high-frequency interference signal is extracted with low inductance upstream of the anti-corrosion resistance $R_K$ in the potential equalization line 7. For this purpose, a low-inductance capacitor C is inserted in the control device 1. In the exemplary embodiment in FIG. 4, the base point of the capacitor C is connected by way of example to the potential equalization line 7. Alternatively, the potential equalization line 7 can be connected at high frequency to further suitable points or components in the control device 1.

In detail, the system 25 shown in FIG. 4 has a control device 1 and an electric feed pump 15 which is driven by a brushless direct-current motor 3. The electric feed pump 15 is an EFP and is located in a fuel tank 21 in a fuel feeding module 19. The electrically conductive feeding medium 17, specifically fuel, rinses the brushless direct-current motor 3 here. The housing of the electric feed pump 15 and therefore also the brushless direct-current motor 3 are connected electrically to a potential equalization connection 5 on the control device 1 via a potential equalization line 7.

The brushless direct-current motor 3 has three phases 9, 11, 13 which are connected to the control device 1 via phase connections U, V, W. The control device 1 is arranged outside the fuel tank 21 here. The phase connections U, V, W and the potential equalization line 7 are led to the control device 1 from the fuel tank 21 via a flange 23. The control device 1 has here a B6 inverter 39 with six main transistors T1, T2, T3, T4, T5 and T6. In addition, the control device has a connection to an energy source which is, for example, a battery (+, −). Furthermore a pulse width modulator 41 is provided in the control device 1. The potential equalization line 7 has a line resistance $R_L$, which is significantly smaller than the anti-corrosion resistance $R_K$. The potential equalization line 7 within the control device 1 can also be referred to as a ground rail.

A circuit which is possible as a result of electrolysis in the conductive feeding medium 17 could have the following form: an electric current runs from the positive pole or (+) terminal of the control device 1 to the phase connection U, V or W via the B6 bridge inverter 39. In addition, the electric current flows through the feeding medium resistance $R_F$ formed in the conductive feeding medium 17, to the potential equalization line 7 and ground rail of the control device 1 and from there to the negative pole or to the (−) terminal of the control device 1 via the anti-corrosion resistance $R_K$.

In conclusion it is to be noted that expressions such as "having" or similar are not intended to rule out the possibility of further elements or steps being provided. Furthermore, it is to be noted that "a" does not rule out a plurality. Furthermore, features which are described in conjunction with the various embodiments can be combined with one another in any desired way. It is also to be noted that the reference signs in the claims are not to be interpreted as restricting the scope of the claims.

The invention claimed is:

1. A control device (1) for reducing electrolytic corrosion in a brushless direct-current motor (3), the control device (1) having a potential equalization connection (5);
   a potential equalization line (7) which is configured to connect a brushless direct-current motor (3) to the potential equalization connection (5);
   wherein the control device (1) is designed to actuate phases (9, 11, 13) of the brushless direct-current motor (3);
   characterized in that
   an anticorrosion resistance ($R_K$) is provided on the potential equalization line (7), which anti-corrosion resistance ($R_K$) is designed to reduce a flow of current between the phases (9, 11, 13) of the brushless direct-current motor (3) and the potential equalization line.

2. The control device (1) as claimed in claim 1,
   wherein the potential equalization line (7) has a line resistance ($R_L$);
   wherein the anti-corrosion resistance ($R_K$) is larger than the line resistance ($R_L$).

3. The control device (1) as claimed in claim 1,
   wherein the anti-corrosion resistance ($R_K$) is in a range between 100 kilo-ohms and one mega-ohm.

4. The control device (1) as claimed in claim 1,
   also having a capacitor (C) which is connected in parallel with the anti-corrosion resistance ($R_K$) in such a way that a high-frequency interference signal is extracted from the potential equalization line (7).

5. A system (25) for reducing electrolytic corrosion in a brushless direct-current motor (3), the system (25) having a control device (1) as claimed in claim 1, further comprising
   an electric feed pump (15) into which the brushless direct-current motor (3) is integrated;
   wherein a potential equalization line (7) connects the electric feed pump (15) to the potential equalization connection (5).

6. A method for manufacturing a control device (1) as claimed in claim 1, the method comprising:
   provision of a control device (1) which is designed to actuate phases (9, 11, 13) of a brushless direct-current motor (3);
   provision of a potential equalization connection (5) on the control device (1);
   provision of a potential equalization line (7) which is configured to connect the brushless direct-current motor (3) to the potential equalization connection (5);
   characterized in that the method also has
   provision of an anti-corrosion resistance ($R_K$) on the potential equalization line (7);
   wherein the anti-corrosion resistance ($R_K$) is designed to reduce a flow of current between the phases (9, 11, 13) of the brushless direct-current motor (3) and the potential equalization line (7).

7. The system (25) as claimed in claim 5,
   wherein an electrically conductive feeding medium (17) of the electric feed pump (15) has a feeding medium resistance ($R_F$) between the phases (9, 11, 13) and the potential equalization line (7);
   wherein the anti-corrosion resistance ($R_K$) is connected in series with the feeding medium resistance ($R_F$).

8. The system (25) as claimed in claim 5,
   wherein the anti-corrosion resistance ($R_K$) is arranged in the control device (1).

9. The system (25) as claimed in claim 5,
   wherein the electric feed pump (15) is an electric fuel pump.

10. The system (25) as claimed in claim 5,
    wherein the anti-corrosion resistance ($R_K$) is arranged on a flange (23) between the electric feed pump ($R_F$) and the control device (1).

* * * * *